United States Patent Office 3,247,136
Patented Apr. 19, 1966

3,247,136
METHOD FOR MANUFACTURING POLYMERIC POLYHYDRIC ALCOHOLS
John Wynstra, Berkeley Heights, and Raymond P. Kurkjy, New Brunswick, N.J., assignors to Union Carbide Corporation, a corporation of New York
No Drawing. Filed June 15, 1960, Ser. No. 36,167
6 Claims. (Cl. 260—18)

This application is a continuation-in-part of application Serial No. 655,197 filed April 26, 1957, now abandoned.

The present invention relates to resinous compositions and to a method for manufacturing the same.

Resinous compositions, e.g., synthetic coating compositions, known to the art include epoxy resin preparations. These resins are traditionally manufactured by reacting polyhydric phenols with materials such as epihalohydrins. The resins, after purification, are then esterified and finally coating compositions are formulated therefrom.

The epoxy resins of commerce today can be divided into two broad classes of resins: liquid resins and brittle, solid resins.

Chemically, the two classes of epoxy resins are similar enough so that a generalized formula can be written for both, as for example as follows, wherein the epoxy resin is formed from 2,2-di(p-hydroxyphenyl)propane and epichlorohydrin:

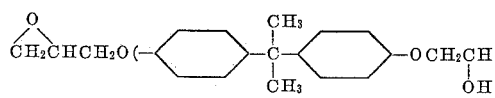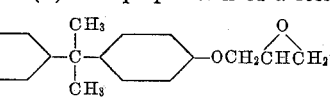

We regard as liquid epoxy resins or as low-melting solid epoxy resins those having a value of $x$ from about 0 to about 1. We regard as brittle solid epoxy resins those having a value of $x$ from about 2 to about 20. Epoxy resins suitable for esterification, i.e., suitable for use in oleoresinous coating compositions generally have a value of $x$ between about 4 and about 10.

Although solid epoxy resins have been most useful in synthetic coating applications, the aforementioned solid resins present processing problems relative to purification. The prevailing method of manufacture of the solid resins results in the formation of salts. Removal of these salts from the solid resins can only be accomplished by solvating the mixture of solid resins and salts and filtering off the salts. The economic necessity of recovery of the solvent increases production time and costs.

Liquid epoxy resins, as aforesaid, are also known to the art. Except for their reduced molecular weight and viscosity, they are similar to the aforesaid solid epoxy resins and may be prepared from the same reactants. Liquid or low melting solid epoxy resins used directly in oleoresinous varnishes would not give useful properties. The viscosities of such coatings would be too low, the drying speeds would be very slow, and the finishes would have unsatisfactory hardness and resistance to chemicals such as sodium hydroxide.

The present invention solves the aforementioned processing problems. Whereas prior art processes involved a number of involved steps, e.g., preparation of the brittle, solid resin, removal of salts from the resin by solvating the mixture containing the resin and the salts and filtering off the salts, removing and recovering the solvent from the resin, and finally esterifying the resin; the present invention can be practiced in one continuous operation wherein the resin is prepared and then esterified without first having to solvate the reaction mixture in order to allow removal of the undersirable salts from the resin.

In accordance with the present invention, we manufacture resinous compositions by (1) reacting low molecular weight diglycidyl ethers of dihydric phenols, dihydric phenols, and monobasic fatty acids at elevated temperatures to obtain polyhydric alcohols free of terminal epoxy groups and then (2) reacting said polyhydric alcohols with monobasic fatty acids at elevated temperatures to obtain resinous products.

As aforesaid, the process of the present invention may be divided conveniently into two steps:

(1) The preparation of polyhydric alcohols free of terminal epoxy groups by the reaction of diglycidyl ethers of dihydric phenols with dihydric phenols and monobasic fatty acids.

(2) The preparation of a resinous composition by the esterification of the product of step 1 with monobasic fatty acids.

Step 1 may be represented by the following equation:

(A)  RCOOH +
(B)

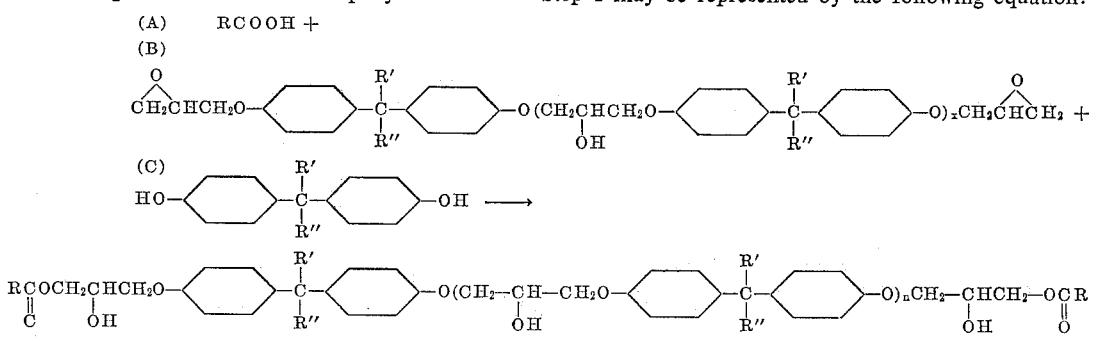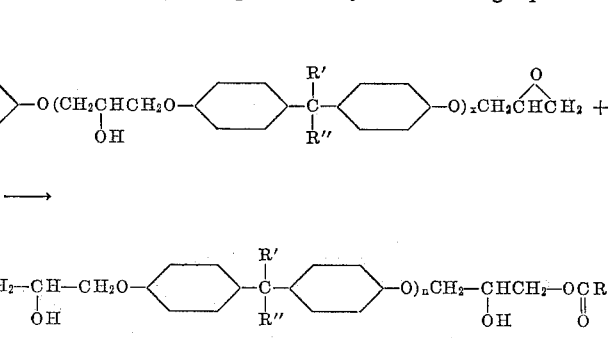

wherein R is the hydrocarbon group of the fatty acid chain, R' is an alkyl group, R'' is an alkyl group, $x=0$ to about 2.5 or higher if desired, but preferably 0 to about 1, $n=$ about 3 to about 50, preferably about 6 to about 30, and A, B, and C correspond to the number of moles of initial reactants and are related as follows: $A+2C=2B$. A, B, and C have the following relationship to $n$ and $x$:

$$A=2+x \qquad B=\frac{n}{2}+1 \qquad C=\frac{n}{2}-\frac{x}{2}$$

The present invention is concerned more particularly with the utilization of liquid or low melting solid epoxy resins having a value of $x$ between 0 and about 1, advantageously up to about 2.5. It will also be appreciated by one skilled in the art after familiarizing himself with the present disclosure that the invention can be applied to resins having a value of $x$ considerably in excess of 2.5. It suffices that the glycidyl ether has a value of $x$ lower than the value of $n$ desired in the reaction product made in accordance with this invention.

According to the present invention, it is required that the number of equivalents of the acid plus the number of equivalents of the dihydric phenol be equal to the number of equivalents of the diglycidyl ether. In the present reaction the acid is monofunctional and both the diglycidyl ether and the dihydric phenol are bifunctional. Thus, if $A=2$ moles or 2 equivalents and $n=3$, then $B=2.5$ moles or 5 equivalents and $C=1.5$ moles or 3 equivalents.

Likewise, when $A=2$ moles and $n=6$, then $A=2$ equivalents, $B=4$ moles or 8 equivalents and $C=3$ moles or 6 equivalents.

The resulting resin is a polymeric polyhydric alcohol free of terminal epoxy groups or a resin with zero epoxy value.

Step 2 is the esterification of the aforementioned polymeric polyhydric alcohol with additional monobasic fatty acid and may be represented as follows:

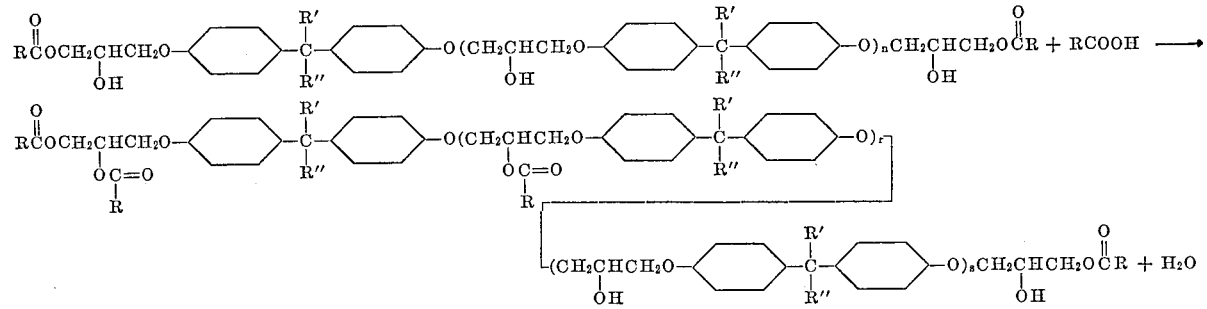

wherein R is the hydrocarbon residue of a fatty acid chain, R' is an alkyl group, R" is an alkyl group, $n=$ about 3 to about 50, but preferably about 6 to about 30 and the sum of $r$ and $s=n$.

As aforesaid, the initial reactants are monobasic fatty acids, dihydric phenols, and diglycidyl ethers of dihydric phenols.

The organic fatty acids useful in accordance with this invention have the formula RCOOH wherein R is a hydrocarbon group, preferably having 8 to 22 carbon atoms inclusive.

When the process is directed toward the formulation of air drying compositions, the fatty acids can be derived from vegetable oils, such as linseed, castor, soybean, cottonseed, and the like. For air drying compositions only substantially unsaturated fatty acids are useful. Saturated fatty acids are useful for applications which do not require drying characteristics. Such non-drying compositions are useful as modifiers for other thermosetting resins, for example, as plasticizers for urea and melamine formaldehyde resins. The organic fatty acids employed in the two steps of the reaction may be the same or different.

The dihydric phenols suitable for the present invention include, among others, the mononuclear phenols, such as hydroquinone, catechol, resorcinol, and the like; the polynuclear phenols, such as the di(4-hydroxyphenyl)alkanes. Among suitable dinuclear phenols, which includes the di(4-hydroxyphenyl)alkanes, are di(4-hydroxyphenyl)methane, 2,2-di(4-hydroxyphenyl)propane, 2,2-di(4-hydroxyphenyl)butane, di(4 - hydroxyphenyl)ethane, and other like compounds. Also suitable are the dihydric phenols which have alkyl, aryl, or halogen ring substituents. These compounds are exemplified by the alkyl resorcinols, the tribromo resorcinols, and the substituted diphenols of the Bender, et al. Patent 2,506,486, which is incorporated herein by reference.

The glycidyl ethers or, more particularly, the diglycidyl ethers, may be the reaction products of materials such as dihydric phenols and epihalohydrins. The preparation of these glycidyl ethers is disclosed by Bender et al., supra, and while not a part of the present invention, is given here in the interest of completeness.

The glycidyl ethers useful for the present invention may be made by reacting epichlorohydrin with a diphenol, for instance, any of the diphenols set forth above, in the ratio of two moles of epichlorohydrin per mole of diphenol. It is generally convenient, but not necessary to carry out the reaction using more than two moles of the epichlorohydrin per mole of diphenol. Sodium hydroxide, or other alkali or basic oxide in an amount which is at least sufficient to bind, as chloride, the chlorine present in the reacted chlorohydrin, is used to complete the reaction. By way of illustration, 228 parts (1 mole) of 2,2-di(4-hydroxyphenyl)propane (diphenylolpropane) is dissolved in a mixture containing 800 parts of water, 80 parts (2 moles) of sodium hydroxide, and 400 parts of ethanol, and the resulting solution added to a mixture of 400 parts (4.31 moles) of epichlorohydrin in 400 parts of ethanol at a temperature of 50° C. Preferably, the diphenol is added to the epichlorohydrin in such fashion that the epichlorohydrin is maintained in excess during the reaction. The reaction mixture is then heated at a temperature of 80° C. for a period of about an hour. Excess epichlorohydrin and alcohol solvent are removed from the reaction mixture, as by distillation, and the residue thus obtained may be dissolved in benzene and washed successively with caustic solution and water to remove the chloride salt and other water-soluble impurities. The diglycidyl ether of 2,2-di(4-hydroxyphenyl) propane which remains as a somewhat impure residue product upon removal of the benzene may be purified by distillation, if desired, collecting it as a fraction boiling at 230° C. to 270° C. at a reduced pressure of 0.5 to 0.7 millimeter of mercury, or at 150° C. in a molecular still at 10 microns pressure.

A preferred glycidyl ether for the purposes of this invention has the general formula:

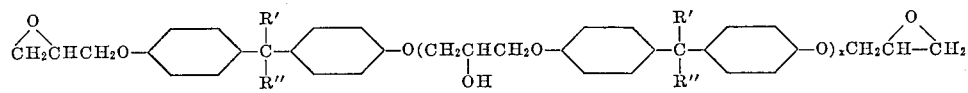

wherein $x=0-1$, R', R" are alkyl groups, preferably lower alkyl groups, having a maximum of 4 carbon atoms and may be the same or different.

The proportion of the reactants are varied according to the degree of polymerization required in the product of the first step of the reaction. Generally, the low viscosity polyhydric alcohols will yield, on esterification, slow drying compositions of decreased hardness and caustic resistance, whereas the high viscosity polyhydric alcohols will yield fast drying coating compositions of increased hardness and caustic resistance. The high solvent requirements of high viscosity compositions, with the resultant deposition of films undesirably thin for many applications, however, places an effective maximum on the viscosity which possesses practical utility. Thus a proper balance is desirable between viscosity and solids content. Generally speaking, useful coating compositions have solids contents of from about 40% to about 50% when thinned to application viscosities (about A to about M on the Gardner-Holdt scale). These properties are achieved in the present invention by a proper choice of the molar proportions of reactants in the first step.

We prefer to practice the present invention by first introducing a predetermined amount of the aforementioned fatty acid and all of the diglycidyl ether and dihydric phenol into a suitable reaction vessel and adding a catalyst such as calcium naphthenate and a quantity of a solvent such as xylene. Based on the weight of the reaction mix, about 0.05% of the aforementioned catalyst, for example, calculated as weight of calcium and about 3% of xylene has been found satisfactory.

The catalyst may be any convenient source of base which is soluble in the varied raw materials. Other naphthenates meeting this requirement are lithium and sodium. The octoate salts are also satisfactory. Other suitable catalysts are alkali metal hydroxides and alkali metal salts, such as sodium hydroxide, potassium hydroxide, sodium acetate and the like. The proportions of catalyst used govern the time required in the first step. A range of from about 0.01% to about 0.20% has been found desirable. The proportion of catalyst selected is a compromise between a reasonable reaction time and a reasonably small amount of catalyst.

If desired, the addition in step 1 of about 0.05% to about 0.10% of phosphoric acid based on the total weight of the reaction mixture in step 1 may be made. Such addition results in a polyhydric alcohol which, when esterified, yields a coating composition of improved color.

The reaction mixture is then heated for about one hour to about three hours at a temperature from about 160° C. to about 230° C. and then refluxed to constant viscosity or zero epoxide as determined by pyridine hydrochloride to obtain the aforementioned polyhydric alcohol. This measurement is conducted by heating 5–10 grams of the reaction mix for 20 minutes at the boiling point in an excess of pyridine containing pyridine hydrochloride and back titrating the excess pyridine chloride with 0.1 N sodium hydroxide using bromcresol purpose as indicator and considering that 1 mole of the HCl is equivalent to one epoxide group.

The viscosity of the reaction product will increase according to the molar ratio of the glycidyl ether to the dihydric phenol.

To the reaction mixture containing the polyhydric alcohol is then added additional monobasic acid to effect an esterification of at least some of the hydroxyl groups of the polyhydric alcohol. The amount of monobasic acid added will depend upon the desired degree of esterification. The higher the degree of esterification, the more flexible and softer will be coatings formed from such compositions. Conversely, the lower the degree of esterification, the less flexible and more rigid will be such coatings. The term "degree of esterification" as used herein refers to the percent hydroxyl groups of an average polyhydric alcohol molecule which have been esterified. Generally the degree of esterification is at least about 20 percent, preferably from about 40% to about 90% and higher if so desired. The reaction mixture containing the polyhydric alcohol and the additional monobasic acid is then heated at temperatures of from about 200° C. to reflux for a period of time sufficient to effect substantially complete reaction of the monobasic acid. Generally the heating operation is conducted over a period of about 3–10 hours. Completion of the reaction is indicated by the substantial absence of free acid in the reaction mixture as determined by a conventional acid number determination. The oleoresinous mixture is then adjusted to the desired solids content by the addition thereto of conventional solvents such as xylene and allowed to cool.

The following examples further illustrate the present invention and are not intended to limit the scope thereof in any manner.

EXAMPLE 1

*Short oil linseed ester*

|   |   | Grams | Equiv. | Moles |
| --- | --- | --- | --- | --- |
| 1 | 2,2-di(4-hydroxyphenyl) propane | 101.5 | 0.89 | 0.445 |
| 2 | ERL-2774 [1] | 203.0 | 1.00 | 0.500 |
| 3 | Linseed oil fatty acids | 30.8 | 0.11 | 0.110 |
| 4 | Calcium naphthenate (5% Ca) | 3.35 |   |   |
| 5 | Xylene | 5 (ml.) |   |   |
| 6 | Linseed oil fatty acids | 172.2 |   |   |

[1] A glycidyl ether manufactured by Union Carbide Plastics Co., a division of Union Carbide Corporation, having the formula noted in col. 1 of this application in which the value of x is about 0.23.

Reactants 1–5 were heated to 230° C. and held at 230° C. for one hour at which time the viscosity was constant at U (Gardner-Holdt) when thinned to 40% non-volatile in butyl "Carbitol." This is a registered trademark for diethylene glycol monobutyl ether, manufactured by Union Carbide Chemicals Co., a division of Union Carbide Corporation. The polyhydric alcohol produced had a zero epoxy value as determined by the aforementioned pyridine hydrochloride test and $n$=about 18.

Reactant 6 was added and the mixture heated to 260° C. The mixture was refluxed at 260° C. for 6 hours using xylene to remove the water azeotropically. The degree of esterification was 49.9%. Enough xylene was added to reduce the composition to 50% solids and the mixture was cooled to room temperature.

Color (50% solids in xylene) __ 8–9 (1933 Gardner).
Viscosity (50% solids in
    xylene) _____ J-K (Gardner-Holdt).
Acid No. (100% basis) _____ 2.86 mg. KOH/gram.

A portion of the varnish was reduced to viscosity E with xylene (43.8% solids) and 0.04% cobalt was added as cobalt naphthenate. Films were applied to glass using a 0.0015" Bird Applicator and air dried.

Drying time:
    Set to touch _____min__ 25
    Print-free _____hrs__ 8
    Tack-free _____hrs__ 8

Walker-Steele hardness:
    24 hrs. _____ 102
    72 hrs. _____ 204
    7 da. _____ 220

Alkali resistance: 5% NaOH at 25° C. _____hrs__ 48

Since the general procedures for the remaining examples were identical to that used for Example 1, the procedures for the ensuing examples are not set forth in detail.

EXAMPLE 2

*Short oil dehydrated castor ester*

|   |   | Grams | Equiv. | Moles |
| --- | --- | --- | --- | --- |
| 1 | 2,2-di(4-hydroxyphenyl) propane | 101.5 | 0.89 | 0.445 |
| 2 | ERL-2774 | 203.0 | 1.00 | 0.500 |
| 3 | Dehydrated castor oil acids | 31.0 | 0.11 | 0.110 |
| 4 | Calcium naphthenate (5% Ca) | 3.35 |   |   |
| 5 | Xylene | 10 (ml.) |   |   |
| 6 | Dehydrated castor oil acids | 172.0 |   |   |

Reactants 1–5 were held at 230° C. for 1½ hours. Reactant 6 was added and the mixture refluxed at 260° C. for 4¾ hours. The degree of esterification was 49.8% and $n$=about 18.

Color (50% solids in
  xylene) _____ 8–9 (1933 Gardner).
Viscosity (50% solids in
  xylene) _____ Q–R (Gardner Holdt).
Acid No. (100% basis) _____ 2.76 mg. KOH/gram.
Percent solids at viscosity E ___ 40.7.

Drying time:
  Set to touch _____ min__ 25
  Print-free _____ hrs__ 6
  Tack-free _____ hrs__ 6

Walker-Steele hardness:
  24 hrs. _____ 195
  72 hrs. _____ 200
  7 da. _____ 223

Alkali resistance: 5% NaOH at 25° C. _____ hrs__ 28

EXAMPLE 3

*Short oil soya ester*

|   |                              | Grams    | Equiv. | Moles |
|---|------------------------------|----------|--------|-------|
| 1 | 2,2-di(4-hydroxyphenyl) propane. | 101.5  | 0.89   | 0.445 |
| 2 | ERL-2774                     | 203.0    | 1.00   | 0.500 |
| 3 | Soybean acids                | 31.0     | 0.11   | 0.110 |
| 4 | Calcium naphthenate (5% Ca)  | 3.35     |        |       |
| 5 | Xylene                       | 10 (ml.) |        |       |
| 6 | Soybean acids                | 172.0    |        |       |

Reactants 1–5 were held at 230° C. for one hour. Reactant 6 was added and the mixture refluxed at 260° C. for 5¼ hours. The degree of esterification was 49.8% and n=about 18.

Color (50% solids in
  xylene) _____ 9–10 (1933 Gardner).
Viscosity (50% solids
  in xylene) _____ F (Gardner-Holdt).
Acid No. (100% basis) _____ 3.88 mg. KOH/gram.
Percent solids at
  viscosity D–E _____ 47.2.

Drying time:
  Set to touch _____ min__ 25
  Print-free _____ hrs__ 6
  Tack-free _____ hrs__ 6

Walker-Steele hardness:
  24 hrs. _____ 153
  72 hrs. _____ 180
  7 da. _____ 196

Alkali resistance: 5% NaOH at 25° C. _____ hrs__ 28

EXAMPLE 4

*Short oil soya ester*

|   |                              | Grams.   | Equiv. | Moles |
|---|------------------------------|----------|--------|-------|
| 1 | 2,2-di(4-hydroxyphenyl) propane. | 106.7 | 0.936  | 0.468 |
| 2 | ERL-2774                     | 203.0    | 1.000  | 0.500 |
| 3 | Soybean acids                | 18.2     | 0.064  | 0.064 |
| 4 | Calcium naphthenate (5% Ca)  | 3.28     |        |       |
| 5 | Xylene                       | 5 (ml.)  |        |       |
| 6 | Soybean acids                | 188.3    |        |       |

Reactants 1–5 were held at 230° C. for 2 hours. Reactant 6 was added and the mixture was refluxed at 260° C. for 6¼ hours. The degree of esterification was 54.5% and n=about 33.

Color (50 solids in
  xylene) _____ 9–10 (1933 Gardner).
Viscosity (50% solids
  in xylene) _____ I (Gardner-Holdt).
Acid No. (100% basis) _____ 2.3 mg. KOH/gram.
Percent solids at
  viscosity E _____ 45.6.

Drying time:
  Set to touch _____ min__ 25
  Print-free _____ hrs__ 8
  Tack-free _____ hrs__ 8

Walker-Steele hardness:
  24 hrs. _____ 167
  72 hrs. _____ 192
  7 da. _____ 200

Alkali resistance: 5% NaOH at 25° C. _____ hrs__ 48

EXAMPLE 5

*Long oil linseed ester*

|   |                              | Grams     | Equiv. | Moles |
|---|------------------------------|-----------|--------|-------|
| 1 | 2,2-di(4-hydroxyphenyl) propane. | 85.5  | 0.750  | 0.375 |
| 2 | ERL-2774                     | 203.0     | 1.000  | 0.500 |
| 3 | Linseed oil fatty acids      | 70.0      | 0.250  | 0.250 |
| 4 | Calcium naphthenate (5% Ca)  | 3.6       |        |       |
| 5 | Xylene                       | 17.5 (ml.)|        |       |
| 6 | Linseed oil fatty acids      | 305.0     |        |       |

Reactants 1–5 were held at 160° C. for 3 hours. The temperature was raised to 260° C. and held there for 1½ hours. Reactant 6 was then added and the mixture refluxed at 260° C. for 10 hours. The degree of esterification was 88.4% and n=about 6.7.

Color (50.8% solids
  in mineral spirits) _____ 8 (1933 Gardner).
Viscosity (50.8% solids in
  mineral spirits) _____ U (Gardner-Holdt).
Acid No. (100% basis) _____ 6.0 mg. KOH/gram.

Drying time:
  Set to touch _____ hr__ 1
  Print-free _____ hrs__ 2
  Tack-free _____ hrs__ 2¾

Walter-Steele hardness:
  24 hrs. _____ 110
  72 hrs. _____ 158

Alkali resistance: 5% NaOH at 25° C. _____ hrs__ 3

EXAMPLE 6

*Short oil dehydrated castor ester*

|   |                              | Grams    | Equiv. | Moles |
|---|------------------------------|----------|--------|-------|
| 1 | 2,2-di(4-hydroxyphenyl) propane. | 45.4  | 0.398  | 0.199 |
| 2 | EKR-2002 [1]                 | 231.0    | 0.462  | 0.231 |
| 3 | Dehydrated castor acids      | 35.8     | 0.128  | 0.128 |
| 4 | Calcium naphthenate (5% Ca)  | 3.12     |        |       |
| 5 | Xylene                       | 10       |        |       |
| 6 | Dehydrated castor acids      | 148.5    |        |       |

[1] An epoxy resin based on bisphenol-A and epichlorohydrin manufactured by Union Carbide Plastics Co. having an epoxy equiv. wt. of 500 or an "x" value of 0.463 (see col. 4) and a ball and ring melting point of 68° C.

The degree of esterification was 43.0% and n=about 7. Varnish made in the same way as Example 2 has essentially the same properties as the varnish of Example 2.

Color (50% N.V. in xylene) _____ 8 (1933 Gardner).
Viscosity (50% N.V. in xylene) ___ Q (Gardner-Holdt).
Acid No. (100% solids basis) _____ 3.

The drying characteristics are also essentially the same as in Example 2.

Variations and modifications of the principles herein disclosed may be made without departing from the spirit of the present invention. Insofar as the variations or modifications are within the purview of the appended claims, they are to be considered a part of the present invention.

What is claimed is:

1. Process for the preparation of resinous compositions which comprises reacting a mixture containing A moles of a monobasic fatty acid having the formula RCOOH wherein R is a hydrocarbon group having 8 to 22 carbon atoms inclusive, B moles of a diglycidyl ether of a dihydric phenol having $x$ number of repeating units and C moles of a dihydric phenol having phenolic hydroxyl groups as the sole reactive groups under the conditions of the reaction, the relationship of said moles of reactants being as follows: $A+2C=2B$, at elevated temperatures to obtain a polyhydric alcohol of zero epoxy value and having $n$ number of repeating units wherein N is greater than $x$ and has a value of about 3 to about 50, the relationship of the repeating units to the moles of reactants is as follows:

$$A=2+x, \ B=\frac{n}{2}+1, \ C=\frac{n}{2}-\frac{x}{2}$$

and reacting said polyhydric alcohol with additional monobasic fatty acid to effect at least a partial esterification of said polyhydric alcohol.

2. Process according to claim 1 in which the fatty acid is at least one member selected from the group consisting of linseed oil acids, soybean oil acids and castor oil acids.

3. Process according to claim 1 in which the dihydric phenol which is reacted with the said acid and said diglycidly ether is 2,2-di(4-hydroxyphenyl)propane.

4. Process according to claim 1 in which the diglycidyl ether has the general structural formula:

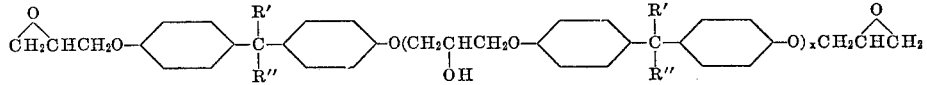

in which $x=0$ to about 2.5 and R′ and R″ are alkyl groups each having a maximum of 4 carbon atoms.

5. Process for the preparation of resinous compositions which comprises preparing a polyhydric alcohol of zero epoxy value represented by the following formula:

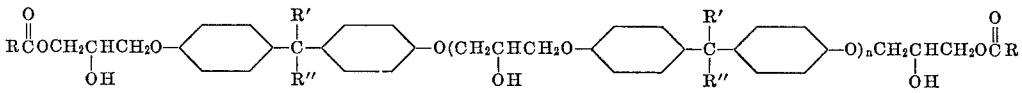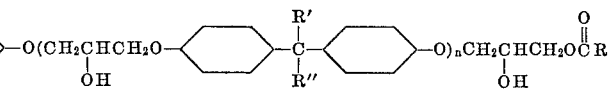

wherein R is the hydrocarbon group of monobasic fatty acid having 8 to 22 carbon atoms inclusive, R′ and R″ are lower alkyl radicals each having a maximum of 4 carbon atoms and $n$ is an integer having a value of from about 3 to about 50, said polyhydric alcohol being formed by reacting a mixture containing A moles of fatty acid having the general formula RCOOH wherein R has the same meaning as above, B moles of diglycidyl ether represented by the formula:

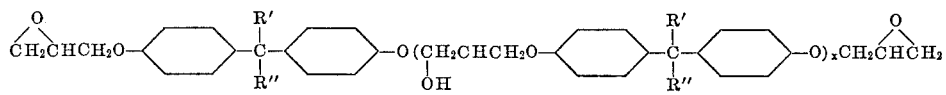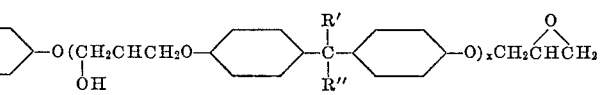

wherein R′ and R″ have the same meaning as above and $x$ is an integer having a value less than $n$, and C moles of a dihydric phenol having phenolic hydroxyl groups as the sole reactive groups under the conditions of the reaction, the relationship of said moles of reactants being as follows: $A+2C=2B$, and the relationship of the moles of reactants to $n$ and $x$ being as follows:

$$A=2+x, \ B=\frac{n}{2}+1, \text{ and } C=\frac{n}{2}-\frac{x}{2}$$

and esterifying at least some of the hydroxyl groups of said polyhydric alcohol with a monobasic fatty acid.

6. The process as defined in claim 5 wherein $x$ has a value of from 0 to about 1 and $n$ has a value of from about 6 to about 30.

References Cited by the Examiner

UNITED STATES PATENTS

| | | | |
|---|---|---|---|
| 2,493,486 | 1/1950 | Greenlee | 260—18 |
| 2,503,726 | 4/1950 | Greenlee | 260—18 |
| 2,615,007 | 10/1952 | Greenlee | 260—18 XR |
| 2,653,141 | 9/1953 | Greenlee | 260—18 |
| 2,668,805 | 2/1954 | Greenlee | 260—18 XR |
| 2,877,195 | 3/1959 | McNabb | 260—18 |
| 2,934,506 | 4/1960 | Hicks et al. | 260—18 |
| 2,935,488 | 5/1960 | Phillips et al. | 260—18 XR |
| 2,944,035 | 7/1960 | Wear | 260—18 |

LEON J. BERCOVITZ, *Primary Examiner.*

ALPHONSO D. SULLIVAN, MILTON STERMAN,
*Examiners.*